(12) United States Patent
Koniaris et al.

(10) Patent No.: US 9,081,517 B2
(45) Date of Patent: Jul. 14, 2015

(54) HARDWARE-BASED AUTOMATIC CLOCK GATING

(75) Inventors: Kleanthes Koniaris, Palo Alto, CA (US); Josh P. de Cesare, Campbell, CA (US); Timothy J. Millet, Mountain View, CA (US); Jung Wook Cho, Cupertino, CA (US); Erik Machnicki, San Jose, CA (US)

(73) Assignee: Apple Inc., Cupertino, CA (US)

( * ) Notice: Subject to any disclaimer, the term of this patent is extended or adjusted under 35 U.S.C. 154(b) by 667 days.

(21) Appl. No.: 13/223,282

(22) Filed: Aug. 31, 2011

(65) Prior Publication Data

US 2013/0055004 A1 Feb. 28, 2013

(51) Int. Cl.
*G06F 1/32* (2006.01)
*G06F 1/10* (2006.01)
*G06F 1/24* (2006.01)

(52) U.S. Cl.
CPC .. *G06F 1/10* (2013.01); *G06F 1/24* (2013.01); *G06F 1/3237* (2013.01); *Y02B 60/1221* (2013.01)

(58) Field of Classification Search
None
See application file for complete search history.

(56) References Cited

U.S. PATENT DOCUMENTS

| | | | |
|---|---|---|---|
| 5,465,059 A | 11/1995 | Pan et al. | |
| 5,553,021 A | 9/1996 | Kubono et al. | |
| 5,790,609 A | 8/1998 | Swoboda | |
| 6,347,119 B2 | 2/2002 | Matsumura et al. | |
| 6,426,972 B1 | 7/2002 | Endres et al. | |
| 6,624,681 B1 | 9/2003 | Loyer et al. | |
| 6,647,017 B1 | 11/2003 | Heiman | |
| 6,717,484 B2 | 4/2004 | Ben-Ayun et al. | |
| 6,754,241 B1 | 6/2004 | Krishnamurthy et al. | |
| 6,844,767 B2 * | 1/2005 | Shelor | 327/291 |
| 6,971,038 B2 | 11/2005 | Santhanam et al. | |
| 7,193,543 B1 | 3/2007 | McLeod et al. | |
| 7,256,655 B2 | 8/2007 | He | |
| 7,289,538 B1 | 10/2007 | Paradise et al. | |
| 7,437,583 B2 | 10/2008 | Lu | |

(Continued)

FOREIGN PATENT DOCUMENTS

EP 2282265 2/2011

OTHER PUBLICATIONS

DTA-120 Product Specification, "DVB/ASI Input Adapter for PCI Bus," DEKTEC Digital Video BV, Jul. 2003, 30 pages.

(Continued)

*Primary Examiner* — Paul Yanchus, III
(74) *Attorney, Agent, or Firm* — Rory D. Rankin; Meyertons, Hood, Kivlin, Kowert & Goetzel, P.C.

(57) ABSTRACT

A system and method for automatically updating with hardware clock tree settings on a system-on-a-chip (SOC). A SOC includes a hardware clock control unit (HCCU) coupled to a software interface and a clock tree. The SOC also includes multiple integrated circuit (IC) devices, wherein each IC device receives one or more associated core clocks provided by one or more phase lock loops (PLLs) via the clock tree. The HCCU receives a software-initiated request specifying a given IC device is to be enabled. The HCCU identifies one or more core clocks used by the given IC device. For each one of the identified core clocks, the HCCU configures associated circuitry within the clock tree to generate an identified core clock. The HCCU may also traverse the clock tree and disable clock generating gates found not to drive any other enabled gates or IC devices.

20 Claims, 8 Drawing Sheets

(56) References Cited

U.S. PATENT DOCUMENTS

| | | | |
|---|---|---|---|
| 7,475,374 B1 | 1/2009 | Johnson et al. | |
| 7,580,691 B1 | 8/2009 | Reed et al. | |
| 7,634,028 B2 | 12/2009 | Crawley | |
| 7,787,569 B2 | 8/2010 | Hayem et al. | |
| 7,804,920 B2 | 9/2010 | Deisher et al. | |
| 2003/0071657 A1* | 4/2003 | Soerensen et al. | 326/93 |
| 2003/0185238 A1 | 10/2003 | Strasser et al. | |
| 2003/0189953 A1 | 10/2003 | Matsumura et al. | |
| 2004/0145400 A1 | 7/2004 | Mariggis | |
| 2008/0307240 A1 | 12/2008 | Dahan et al. | |
| 2008/0313480 A1* | 12/2008 | Malhi et al. | 713/323 |
| 2008/0317185 A1 | 12/2008 | Mueller et al. | |
| 2009/0138745 A1 | 5/2009 | Dorsey et al. | |
| 2010/0228955 A1 | 9/2010 | Niggemeier et al. | |

OTHER PUBLICATIONS

Harmonic Inc., "Narrowcast Services Gateway," www.harmonicinc.com/view_csd_product_group.cfm?classID=1040, 2 pages. [Retrieved Mar. 24, 2005].

Harmonic Inc., Digital Video Products, "Narrowcast Services Gateway NSG 8000 Family," 2005, 4 pages.

Harmonic Inc., Digital Video Products, "Narrowcast Services Gateway NSG Family," 2003, 4 pages.

"Model D9479 Gigabit QAM Modulator," Scientific Atlanta, Part No. 4005270 Rev A, Jan. 2004, 3 pages.

Motorola, "SEM SmartStream Encryptor Modulator," 2002, 2 pages.

Cisco Systems,"CISCO UMG9850 QAM Module," www.cisco.com/en/US/products/hw/video/ps5648/5649/, 2 pages. [Retrieved Mar. 24, 2005].

Cisco Systems, "Cisco UMG980 Series Digital Video Networking Products: Cisco uMG9850 QAM Module Data Sheet," printed from the internet: http://www.cisco.com/warp/public/cc/pd/mxsv/prodlit/9850d_ds.pdf, 4 pages. [Retrieved Mar. 24, 2005].

Didier Le Gall, "MPEG: A Video Compression Standard for Multimedia Applications," Communications of the ACM, vol. 34, No. 4. Apr. 1991, pp. 47-58.

* cited by examiner

HARDWARE-BASED AUTOMATIC CLOCK GATING

BACKGROUND OF THE INVENTION

1. Field of the Invention

This invention relates to computing systems, and more particularly, to automatic updating clock tree settings on a system-on-a-chip (SOC).

2. Description of the Relevant Art

A system-on-a-chip (SOC) integrates multiple functions into a single integrated chip substrate. The functions may include digital, analog, mixed-signal and radio-frequency (RF) functions. Typical applications are used in the area of embedded systems. Energy-constrained cellular phones, portable communication devices and entertainment audio/video (A/V) devices are some examples of systems using an SOC. An SOC may use powerful processors that execute operating system (OS) software. In addition, the SOC may be connected to both external memory chips, such as Flash or RAM, and various external peripherals.

The power consumption of integrated circuits (ICs), such as modern complementary metal oxide semiconductor (CMOS) chips, is proportional to at least the expression $fV^2$. The symbol f is the operational frequency of the chip. The symbol V is the operational voltage of the chip. In modern microprocessors, both parameters f and V may be varied during operation of the IC. For example, during operation, modern processors allow users to select one or more intermediate power-performance states between a maximum performance state and a minimum power state.

During the execution of applications on embedded systems, a powerful processor may not be the leading energy-consumer when high-performance memories, color displays, and other functions are being used. An overriding power management goal in portable systems is to reduce system-wide energy consumption. A dynamic power management system on an SOC may support multiple power management policies that allow device manufacturers to specialize policies for their applications and differentiate their products based on their own unique approaches to power management. In addition, as integration increases on a SOC, so does a number of different active clocks and a number of phase lock loops (PLLs) to support the clocks.

Embedded systems may not have a basic-input-output-software (BIOS) or machine abstraction layer to insulate the OS from low-level device and power management. Therefore, the kernel in the OS may handle these tasks. As integration on an SOC increases, the interrelationships between clock sources and power management modes become more complex. Further, other tasks become increasingly difficult, such as managing settings within a clock tree on the SOC. The resulting delay for deciding on parameter values to use within the tree and enabling and disabling particular clock generating gates within the tree causes power to increase and performance to reduce. In addition, the software may leave portions of the clock tree on for a longer amount of time due to the resulting delay causing decisions to be made late.

In view of the above, efficient methods and mechanisms for managing clock tree settings on a SOC are desired.

SUMMARY OF EMBODIMENTS OF THE INVENTION

Systems and methods for automatically updating with hardware clock tree settings on a system-on-a-chip (SOC). In one embodiment, a SOC includes a hardware clock control unit (HCCU) coupled to a software interface and a clock switching network (CSN), or a clock tree. The SOC also includes multiple integrated circuit (IC) devices, wherein each IC device receives one or more associated core clocks provided by one or more phase lock loops (PLLs) via the clock tree. The HCCU may receive a software-initiated request specifying a given IC device on the SOC is to be enabled. The HCCU may identify one or more core clocks used by circuitry within the given IC device. For each one of the identified core clocks, the HCCU may update and set parameters for associated circuitry within the clock tree to generate an identified core clock. The HCCU may also determine a given clock generating gate in a given level of the clock tree has no enabled targets or "children". A target may be another clock generating gate or an IC device within the clock tree. In response to determining there are no targets, the HCCU may disable the given clock generating gate. The HCCU may traverse the clock tree from a bottom level to a top level and disable qualifying clock generating gates.

These and other embodiments will be further appreciated upon reference to the following description and drawings.

Figure 1:
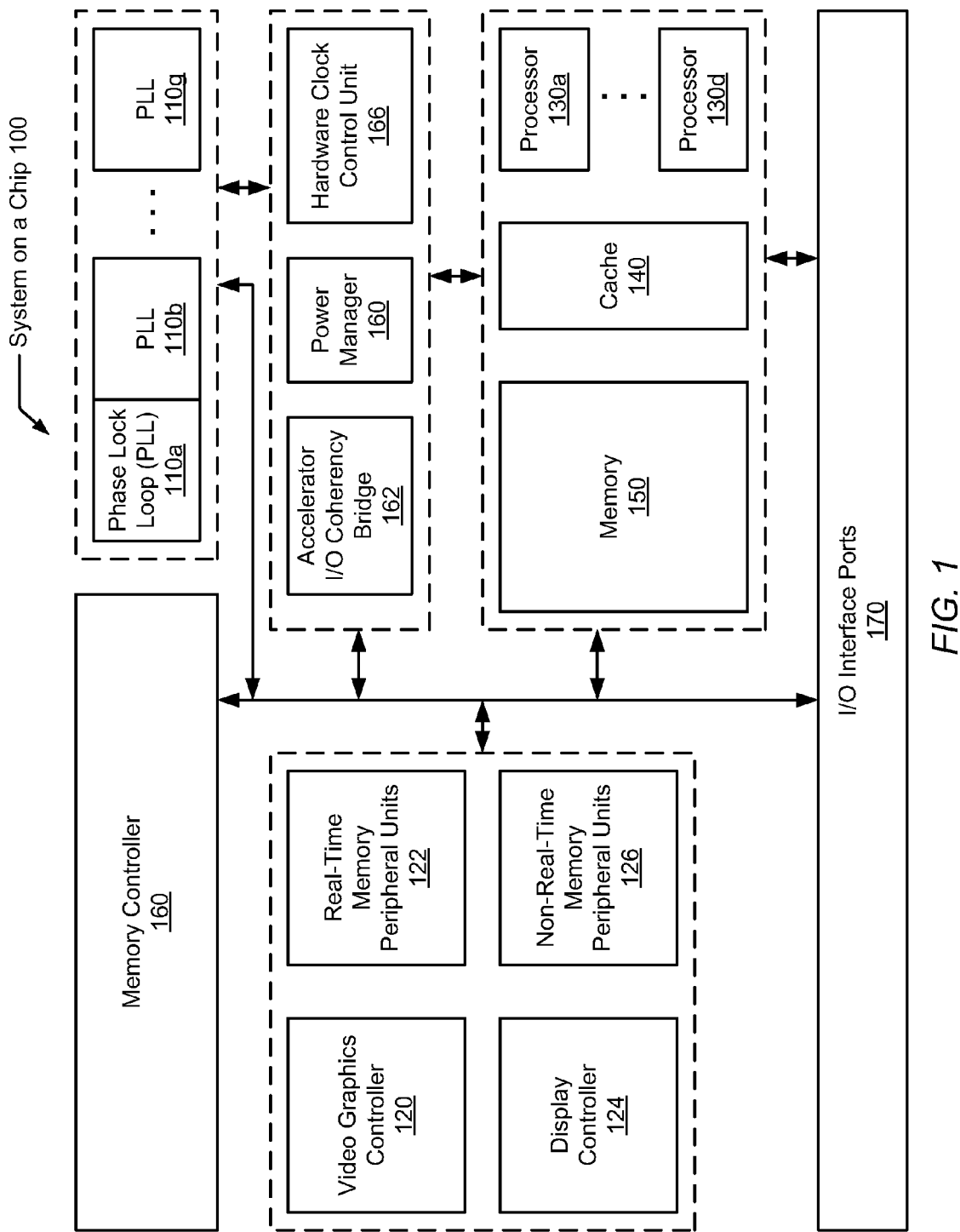
FIG. 1 is a generalized block diagram of one embodiment of a system-on-a-chip (SOC).

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram illustrating one embodiment of a system-on-a-chip (SOC) 100 is shown. The SOC 100 is an integrated circuit (IC) that includes multiple types of IC designs on a single semiconductor die, wherein each IC design provides a separate functionality. Traditionally, each one of the types of IC designs may have been manufactured on a separate silicon wafer. In the illustrated embodiment, the SOC 100 includes one or more clock sources, such as phase lock loops (PLLs) 110a-110g, a memory controller 160, various input/output (I/O) interfaces 170, a memory 150, which may be a non-volatile memory, and one or more processors 130a-130d with a supporting cache hierarchy that includes at least cache 140.

In addition, the SOC 100 may include other various analog, digital, mixed-signal and radio-frequency (RF) blocks. For example, the SOC 100 may include a video graphics controller 120, a display controller 124, real-time peripheral memory units 122 and non-real-time memory peripheral units 126. In order to process applications in an energy-efficient manner on the SOC 100, a central power manager 160 may be included.

The hardware clock control unit (HCCU) 166 may be included within the power manager 160 or alternatively be a separate control block. The HCCU 166 may update associated circuitry with parameter values within a clock switching network (CSN). The CSN may also be referred to as a clock tree. Communication buses, a clock tree and other signal routing across the SOC 100 is not shown for ease of illustration. The HCCU may enable and disable given clock generating gates within the clock tree. The accelerator I/O coherency bridge 162 may provide efficient memory accesses for at least the processors 130a-130d and peripheral devices.

The PLLs 110a-110g may supply source clock signals, which are routed through a clock tree (not shown) to be distributed across the die of the SOC 100 and to provide core clocks to the various processing blocks on the SOC 100. The SOC 100 may use one or more types of PLLs to generate the source clocks signals. For example, an integer PLL may be used. Alternatively, a fractional PLL may be used to generate multiple clock signals with different clock frequencies from a single clock crystal.

For an integer PLL, one or more frequency dividers may be used to provide the output frequency of the output signal as a rational multiple of the input frequency of the input signal 202. In one embodiment, the frequency of an input signal is multiplied by a ratio of an integer value (integer B) of a feedback divider within the PLL to an integer value (integer A) within a pre-divider to generate an output frequency of the output signal. In other words, $\text{frequency}_{output} = \text{frequency}_{input} \times (B/A)$.

In another embodiment, a post-divider may be used to generate an output clock signal for a PLL. Similar to the feedback divider, this post-divider may receive the output signal of the PLL but have a different integer divisor value than the feedback divider. When a post-divider is used, the output frequency is a function of an integer divisor value (integer C) for the post-divider and the integers A and B. When an integer PLL is unable to generate a given clock frequency value within a given threshold, two integer PLLs may be cascaded together.

An alternative to cascaded integer PLLs, the fractional PLL multiplies a frequency of an input signal by an integer and a fraction. The fraction value is generated by continuously changing the feedback divider within the PLL. For example, if a feedback divider alternates between dividing by an integer value of 9 and an integer value of 10, then the output frequency would be 9.5 times the frequency of the input signal. By changing a number of times a division is performed between the integer values of 9 and 10, different fraction values between 9 and 10 may be generated. However, sidebands or spurs at the frequency the divider is being switched may be generated. These spurs may cause interference with other circuitry on-chip and noise reduction techniques may be used to handle them.

The number of clock signals provided on the SOC 100 is a design choice and may depend on a number of clocks signals used by the processing blocks on the SOC 100. The processing blocks may also be referred to as integrated circuit (IC) devices, wherein each IC device receives one or more core clocks provided as outputs from the clock tree. As integration on the SOC 100 increases, so does the number of clock signals to source and to route. System-wide energy consumption increases as more of the PLLs 110a-110g are turned on and resulting clock signals are generated by multiple clock generating gates within the clock tree. In order to reduce system-wide energy consumption, one or more of the IC devices may be turned off when not in use. The HCCU 166 may detect when a given IC device may be ready to be enabled or disabled and send an associated indication to software. One or more algorithms running in a kernel of an operating system (OS) may generate enable and disable requests for given IC devices on the SOC. The HCCU 166 may receive these requests and handle the steps of enabling or disabling a specified IC device.

In addition, one or more clock generating gates within the clock tree may be turned off when not driving another used clock gate or IC device. Managing the turning on of appropriate core clocks for an enabled IC device, the resetting of an enabled IC device, the turning off of associated core clocks for a disabled IC device and the turning off of currently unused clock generating gates within a clock tree core may be burdensome for software. Therefore, the HCCU 166 may perform these tasks.

The central power manager 160 may be included in a general system controller (not shown). A general system controller may manage power-up sequencing of the various processing blocks on the SOC 100 and control multiple off-chip devices via reset, enable and other signals conveyed through the I/O interface ports 170. A general system controller may also manage communication between the various processing blocks on the multiple buses on the SOC 100. The power manager 160 may include power management policies for multiple IC devices on the SOC 100. One or more of the IC devices, such as the processors 130a-130d, GPUs, DSPs, other SIMD cores, and so forth may include internal power management techniques. However, to manage system-wide energy consumption, the power manager 160 may alter one or more operating voltages and operating frequencies to the IC devices on the SOC 100.

Continuing with the clock tree management, software may issue a request to enable a given IC device on the SOC. The HCCU 166 may identify one or more core clocks output by the clock tree and used by circuitry within the given IC device. For each one of the identified core clocks, the HCCU 166 may identify one or more associated clock generating gates within the clock tree used to provide a respective one of the core clocks. For each one of the identified clock generating gates, the HCCU 166 may load parameter values corresponding to a respective one of the core clocks. One example of a parameter value may include a select value to select one of multiple inputs on a glitchless clock switching circuit gate, such as a multiplexer. A second example of a parameter value may be a divisor value for a clock frequency divider circuit gate. These parameter values may be load and stored in configuration registers. After a parameter value is loaded and an internal clock line is detected to be stable, the HCCU 166 may enable a given clock generating gate to provide a clock signal on its output.

The HCCU 166 may also receive a request from software to disable a given IC device on the SOC. In addition, the HCCU 166 may detect a clock generating gate in a bottom level of the clock tree does not provide a clock signal to an enabled IC device. In response to this detection, the HCCU 166 may disable this clock generating device and traverse the clock tree toward the top level. During this traversal, the HCCU 166 may determine whether other enabled clock generating gates provide a clock signal to disabled gates and IC devices. When found, these clock generating gates may be disabled and a next upward level of the clock tree may be inspected. Further details of the features of the HCCU 166 is provided later in the description. Before continuing with more details of the hardware clock control on the SOC, a further description of the SOC 100 is provided below.

Each one of the processors 130a-130d may include one or more cores and one or more levels of a cache memory subsystem. Each core may support the out-of-order execution of one or more threads of a software process and include a multi-stage pipeline. Each one of the processors 130a-130d may include circuitry for executing instructions according to a predefined general-purpose instruction set. For example, the PowerPC® instruction set architecture (ISA) may be selected. Alternatively, the x86, x86-64®, Alpha®, MIPS®, PA-RISC®, SPARC® or any other instruction set architecture may be selected.

Generally, each of the one or more cores within each of the processors 130a-130d accesses an on-die level-one (L1) cache within a cache memory subsystem for data and instructions. The processors 130a-130d may include multiple on-die levels (L2, L3 and so forth) of caches. If a requested block is not found in the on-die caches or in the off-die cache 140, then a read request for the missing block may be generated and transmitted to the memory 150. The memory 150 may be a non-volatile memory block formed from an array of flash memory cells and a memory controller (not shown) for the array. Alternatively, the memory 150 may include other non-volatile memory technology. The memory 150 may be divided into separate addressable arrays to be used by the processors 130a-130d and other processing blocks on the SOC 100. Each addressable array may have its own memory controller. The number of data inputs and outputs and address inputs will depend on the size of the array used.

The processors 130a-130d may share the memory 150 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherency designs between processing blocks and peripherals. In a SOC designs that includes multiple processors and processing blocks, these components communicate with each other to control access to shared resources. Memory coherence may be managed in software, in the accelerator I/O coherence bridge 162, or both. The bridge 162 may also connect low-bandwidth, direct memory access (DMA)-capable IO devices to the memory 150 via an accelerator coherency port (ACP) on one or more of the processors 130a-130d. For off-chip memory requests, the memory controller 160 may be utilized.

The SOC 100 may include multiple processing units, ASICs and other processing blocks. Other processor cores on SOC 100 may not include a mirrored silicon image of processors 130a-130d. These other processing blocks may have a micro-architecture different from the micro-architecture used by the processors 130a-130d. For example, a micro-architecture that provides high instruction throughput for a computational intensive task. Processor core 172 may have a parallel architecture. For example, other processors may include a single instruction multiple data (SIMD) core. Examples of SIMD cores include graphics processing units (GPUs), digital signal processing (DSP) cores, or other. For example, the video graphics controller 120 may include one or more GPUs for rendering graphics for games, user interface (UI) effects, and other applications.

The display controller 124 may include analog and digital blocks and digital-to-analog converters (DACs) for bridging internal blocks to external display physical blocks. The units 122 may group processing blocks associated with real-time memory performance for display and camera subsystems. The units 122 may in clued image blender capability and other camera image processing capabilities as is well known in the art. The units 122 may include display pipelines coupled to the display controller 124.

The units 126 may group processing blocks associated with non-real-time memory performance for image scaling, rotating, and color space conversion, accelerated video decoding for encoded movies, audio processing and so forth. The units 122 and 126 may include analog and digital encoders, decoders, and other signal processing blocks. The I/O interface ports 170 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth.

Figure 2:
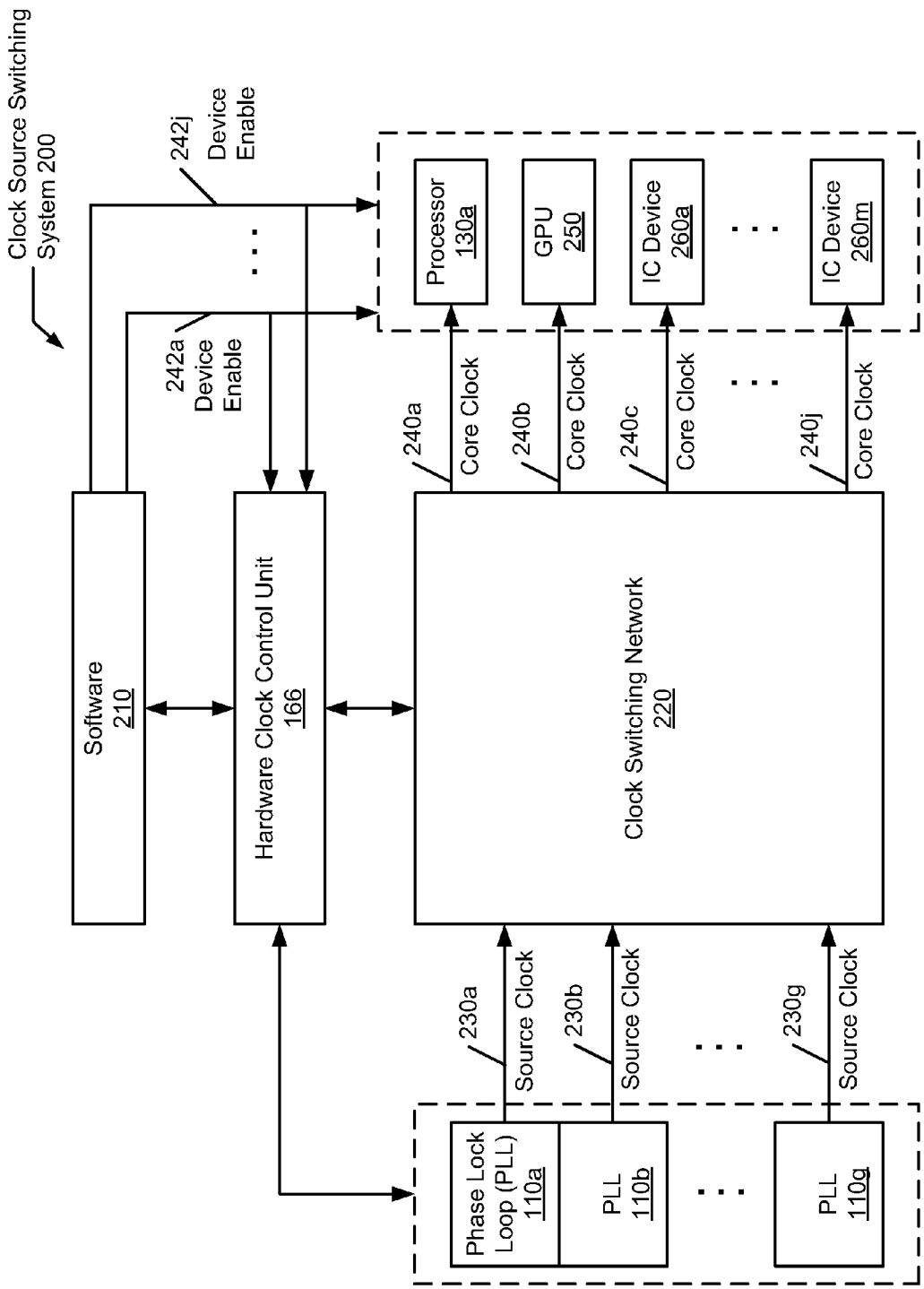
FIG. 2 is a generalized block diagram illustrating one embodiment of a clock source switching system.

Turning now to FIG. 2, a generalized block diagram illustrating one embodiment of a clock source switching system 200 is shown. The switching system 200 may include software 210, which communicates with the HCCU 166 on the SOC 100. The software 210 may be one or more computer programs stored both in a kernel of an operating system (OS) and in a memory accessed by one or more of the processors 130a-130d.

Each of the PLLs 110a-110g may provide a respective one of the source clocks 230a-230g. The IC devices on the SOC 100 may be represented by processor 130a, a graphics processing unit (GPU) 250, and IC devices 260a-260m. Each of the processors 130b-130d is not shown for ease of illustration. Although a single GPU is shown, one or more of the IC devices 260a-260m may include a GPU. Each of the IC devices 260a-260m represent possible functional devices located on the SOC 100 and receiving a respective one of the core clocks 240a-240j. In addition, one or more memories and buses may have a separate generated core clock. Alternatively, a given bus or memory may utilize one of the core clocks 240a-240j.

In one embodiment, each of the core clocks 240a-240j is a different core clock routed on the SOC 100 as an output of the clock switching network 220. In another embodiment, one or more of the core clocks 240a-240j is a same core clock as another routed on the SOC 100 as an output of the clock switching network 220. In other words, two or more of the processor 130a, the GPU 250 and the IC devices 260a-260m may receive a same clock signal.

The clock switching network 220 may connect each one of the core clocks 240a-240j to a respective one of the source clocks 230a-230g. The clock switching network (CSN) 220 may also be referred to as the clock tree 220. The clock switching network 220 may include one or more clock buffers, gated clock buffers that receive a clock enable signal, glitchless clock switching circuits such as glitchless multiplexers (MUXes), clock frequency dividers and so forth.

The software 210 may convey device enable signals 242a-242j to the HCCU 166 when given IC devices are determined by the software 210 to be enabled or disabled. The HCCU 166 may utilize the device enable signals 242a-242j and other information sent in an enable/disable request to control settings within the CSN 220. The device enable signals 242a-242j may also be sent to the IC devices. However, the specified IC device may not actually be enabled and receive a respective running clock of the core clocks 240a-240j until the HCCU 166 has finished adjusting settings within the CSN 220.

In one embodiment, a hardware abstraction layer or library (HAL) is used to couple the software 210 to the HCCU 166. The HAL may be software written in the C programming language or any other suitable programming language. The HAL may be used to manage clock configuration registers within the clock tree. The clock configuration registers may be used to control the clock generating gates in the clock tree. The clock generating gates may include glitchless clock switching gates, such as multiplexers; clock frequency divider gates, PLLs, enabled clock buffers and so forth. One or more clock configuration registers may be used to enable a given clock generating gate and store parameters used to control the operation of the clock generating gate. The parameter values may include clock frequency divisor values, selection values corresponding to one of multiple clock input lines to provide on a clock output line, and so forth.

Each clock configuration register may have an associated software data structure that contains a count of how many enabled "children" are using an associated "parent" clock generating gate. A "child" for the "parent" clock generating gate may be another clock generating gate in a lower level of the clock tree or an IC device coupled to receive a clock signal from the "parent" clock generating gate. The associated software data structure may also contain a cached bit to indicate whether the associated output clock is currently running.

In one embodiment, a single register within the HCCU 166 may store global enable and disable automatic clock gating feature information. For example, one bit within this global register may indicate whether IC devices on the SOC are allowed to request a given one of the core clocks 240a-240j to be enabled or disabled and appropriately changed by an associated "parent" clock generating gate within the CSN 220. A second bit within the global register may indicate whether clock generating gates within the CSN 220 are allowed to change clock output signals to "children". A third bit within the global register may distinguish PLLs from other clock generating gates within the CSN 220 and indicate whether PLLs are allowed to change clock output signals to "children". These global bits may be received by control logic within the HCCU 166, which also may receive the values stored in the clock configuration registers, and used to determine operation updates, if any, of clock generating gates within the CSN 220.

Returning again to the count of enabled "children" for an associated "parent" clock generating gate, in one embodiment, when the count increases from zero to a non-zero value, an associated enable control bit may be set. However, actually turning on of the associated clock generating gate may still be dependent on control logic outputs as described above and circuit timing. The circuit timing may include waiting for an internal clock line to stabilize before enabling it to be provided on an output clock line of the associated clock generating gate. For example, a glitchless clock MUX may not select an input clock line to be provided on an output clock line until the input clock line receives a correct and stable clock signal from above levels within the CSN 220.

When the count is decremented from a non-zero value to zero, an enable control bit may be deasserted and the HCCU 166 may disable the associated clock generating gate. The process of turning off clock generating gates may be automatic and not wait for requests from the software 210. Therefore, unused portions of the CSN 220 may be automatically turned off by hardware, which reduces energy consumption and removes burden from the software 210. The HCCU 166 may also remove burden from the software 210 as described above regarding controlling the enable/disable capabilities of clock generating gates within the CSN 220.

In one embodiment, the software 210 may send a valid request signal to indicate an incoming request and associated enable/disable IC device request information. The request information may include one of the IC device enable IDs 242a-242j. In response to receiving this information from the software 210, the HCCU 166 may identify one or more of the core clocks 240a-240j provided by the CSN 220 and used by circuitry within the specified one of the processor 130a, the GPU 250 or the IC devices 260a-260m. For each one of the identified core clocks, the HCCU 166 may identify one or more associated clock generating gates within the CSN 220 used to provide a respective one of the core clocks 240a-240j.

For each one of the identified clock generating gates, the HCCU 166 may determine a timing of enabling or disabling (depending on the request) associated clock generating gates. For example, a given clock generating gate may not be enabled until gates in upper levels of the CSN 220 are enabled and provide stable clock signals with a correct given frequency. A given clock generating device may not be disabled until all "children" in a lower level of the CSN 220 are disabled. When enabling a clock generating gate, the HCCU 166 may load parameter values stored in configuration registers in to the gate. Again, one example of a parameter value may include a select value to select one of multiple inputs on a glitchless clock switching circuit gate, such as a multiplexer. A second example of a parameter value may be a divisor value for a clock frequency divider circuit gate. After a parameter value is loaded and an internal clock line is detected to be stable, the HCCU 166 may enable a given clock generating gate to provide a clock signal on its output.

Figure 3:
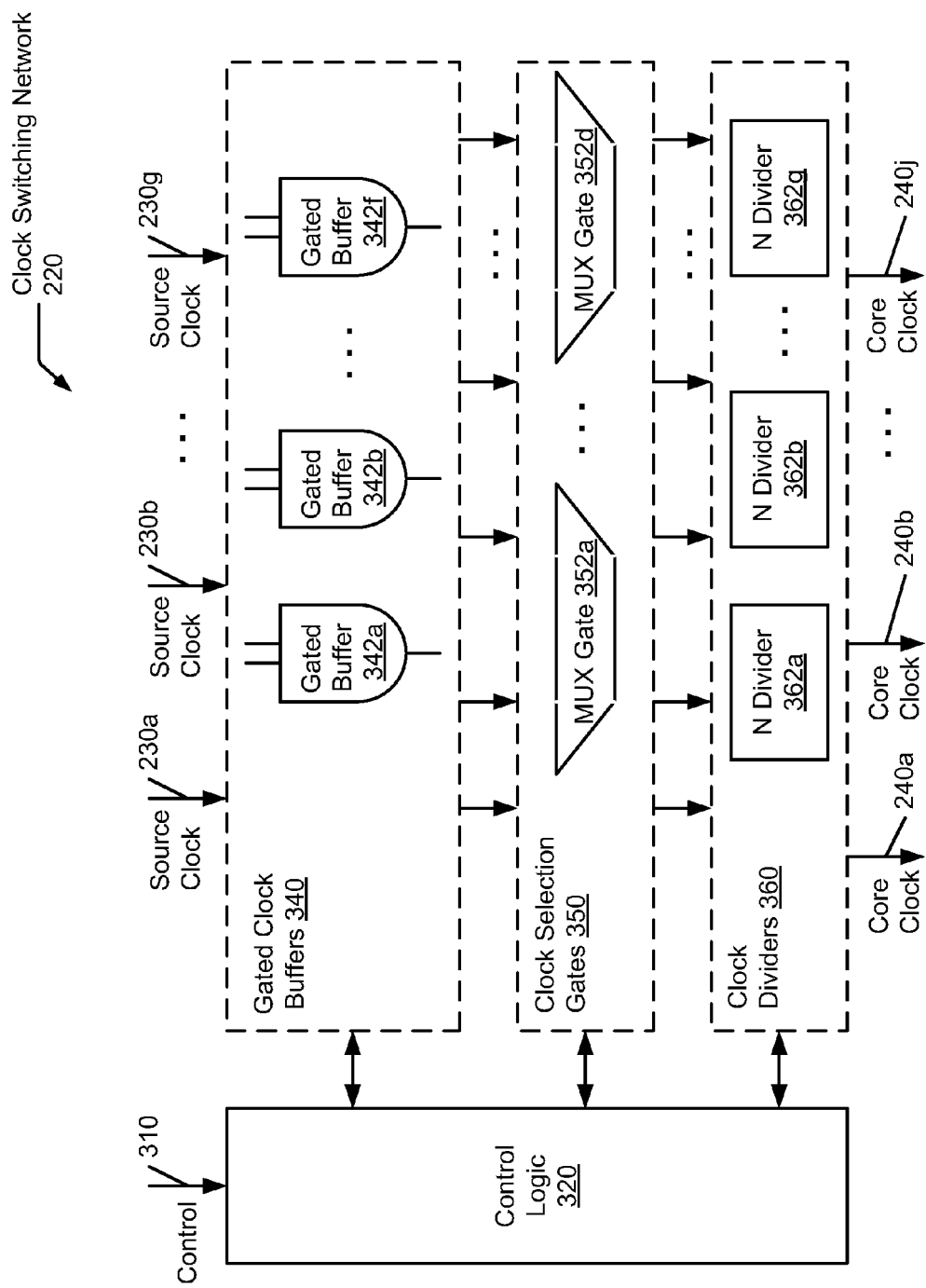
FIG. 3 is a generalized block diagram illustrating one embodiment of a clock switching network.

Turning now to FIG. 3, a generalized block diagram illustrating one embodiment of a clock switching network 220 on a SOC is shown. The clock switching network (CSN) 220 may also be referred to as a clock tree 220. In the illustrated embodiment, the clock switching network (CSN) 220 includes at least gated clock buffers 340, clock selection gates 350 and clock dividers 360. Although the buffers and gates and dividers in the network 220 are shown in this particular order, other combinations are possible and contemplated. Further, other or additional circuitry and logic gates may be utilized as well. The arrangement and placement of the circuitry 340-360 may be set across the die of the SOC 100 in a manner that designers determine provides good design trade-offs.

In addition, the CSN 220 may include control logic 320, which is coupled to at least each one of the circuitry gates 340-360 and the HCCU 166. The control logic 320 may include clock configuration registers used to store parameter values associated with the circuitry gates 340-360. The control logic 320 may provide control signals to the circuitry gates 340-360 for enabling, disabling and changing operation states of given gates.

The multiple configuration registers, power state registers and other registers included in the control logic 320 may be updated by software or hardware. Either the software 310 or the HCCU 166 may provide the control 310. The control signals 310 may be used to update the contents of registers included in the control logic 320 based on included combinatorial logic.

The gated clock buffers 340 may include the gated clock buffers 342a-342f. The gated clock buffers 342a-342f may receive the source clocks 230a-230g provided by the PLLs 110a-110g. Each of the gated clock buffers 342a-342f may receive a clock enable signal. In one embodiment, when the received clock enable signal is asserted, each associated one of the gated clock buffers 342a-342f provides a received clock signal on its output. Otherwise, a binary logic low value may be provided on the associated output. The gated clock buffers 342a-342f may be enabled and disabled as IC devices are turned on and off across the die of the SOC 100 and according to power domain management schemes. The clock enable signals may be asserted and deasserted by at least the control logic 320.

The clock selection gates 350 may include the MUX gates 352a-352d. These gates may receive one or more clock select input signals from the control logic 320. These select input signals may be used to determine which one of two or more clock input signals is to provide an associated clock signal on an output line. The clock select input signals and the multiple clock input signals may be asynchronous with respect to each other. However, the clock select input signals may not be provided to an associated one of the MUX gates 352a-352f until the multiple clock input signals have settled.

In one embodiment, each one of the MUX gates 352a-352f is a glitchless clock MUX gate. As is well known in the art, a glitchless clock MUX gate is typically used for clock selection on a given line while preventing an occurrence of glitching on the given line. Circuit techniques may be used to prevent any glitches on an output line although the received clock lines may be asynchronous and switching delays from one clock source to another clock source may be short.

The clock dividers 360 may include N dividers 362a-362g. The clock N dividers 362a-362g are frequency dividers that generate an output signal with an output frequency that is a divided version of an input frequency of a received input signal. The divided value is represented as the integer N.

In addition, one or more of the N dividers may be a fractional-N frequency synthesizer that is constructed using two integer N dividers. For example, a first divider may be a divide-by-N frequency divider and a second divider may be a divide-by-(N+1) frequency divider. With a modulus controller, an output division value may be toggled between the two integer values N and N+1 in order that an associated oscillator alternates between the two locked frequencies. The oscillator may stabilize at an output frequency that is a time average of the two locked frequencies.

Further, the N dividers 360 may include one or more clock doublers. A clock doubler may create an output signal with two pulses for each received input pulse. A clock doubler may include pulse-width varying circuitry and voltage level comparators. Similar to the clock enables provided to the gated clock buffers 340 and the clock select input signals provided to the clock selection gates 350, divisor values may be provided to the clock dividers 360 by the control logic 320.

Although the PLLs 110a-110g are not shown inside of the CSN 220, the HCCU 166 may enable, disable and load parameter values into the PLLs 110a-110g in a similar manner as for circuitry gates 340-360. Each one of the PLLs 110a-110g may include control logic similar to control logic 320 used to update divisor values and for enabling and disabling circuitry. Additionally, the HCCU 166 may include control logic and configuration registers used to provide control signals to control logic within each one of the PLLs 110a-110g.

As described earlier, although the buffers and gates and dividers in the network 220 are shown in this particular order, other combinations are possible and contemplated. The CSN 220 may be organized in levels. For example a bottom level may include multiple N dividers providing the core clocks 240a-240j. The "children" of these N dividers may be the IC devices. A next upper level may include clock buffers or clock MUX gates, which act as "parents" for the N dividers by providing an input clock signal to the N dividers. Similarly, a next upper level may include clock buffers and N dividers that provide clock signals and act as "parents". The top level may include the PLLs 110a-110g providing the source clocks 230a-230g.

Figure 4:
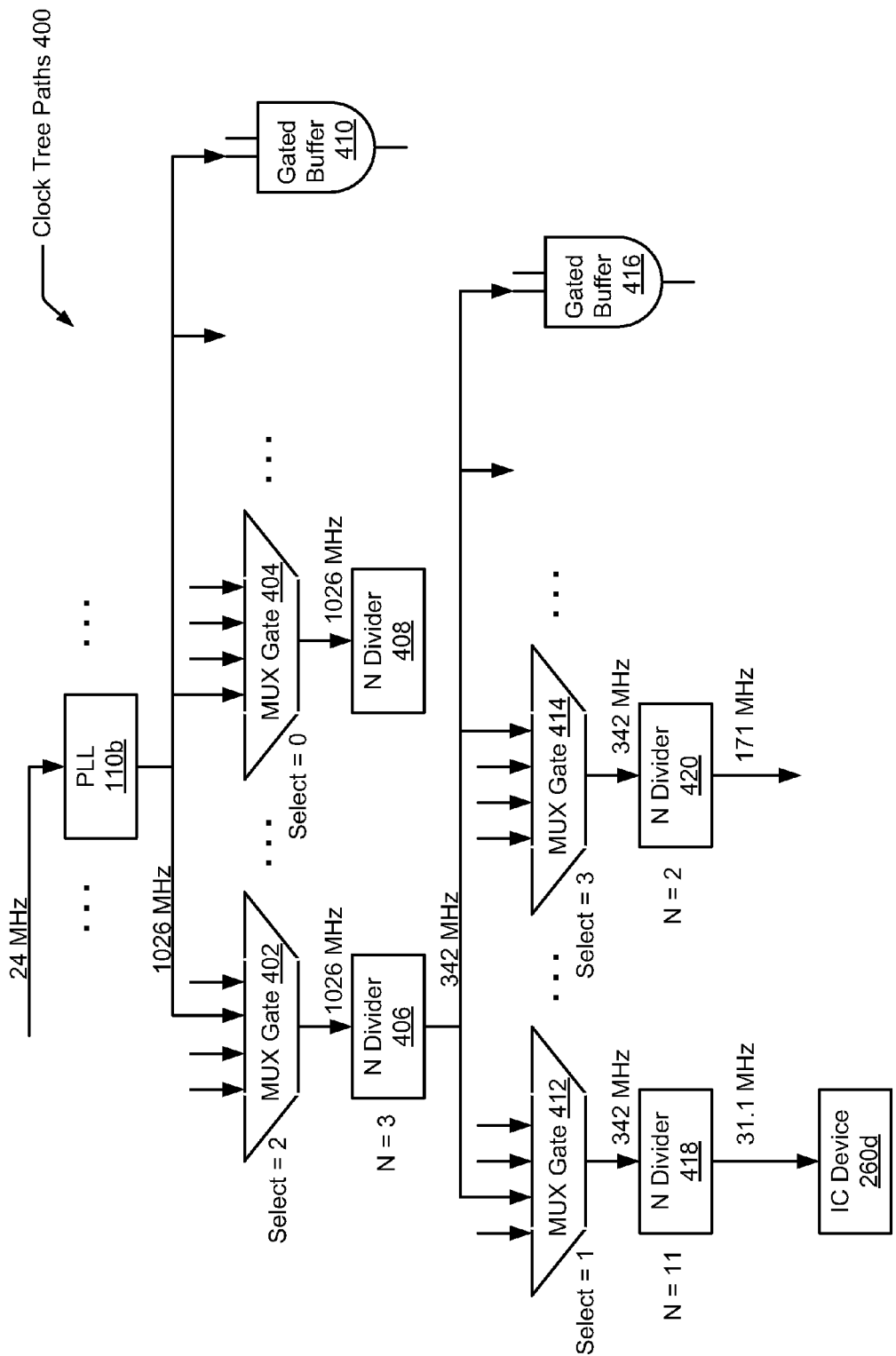
FIG. 4 is a generalized block diagram illustrating one embodiment of clock tree paths.

Referring now to FIG. 4, a generalized block diagram illustrating one embodiment of clock tree paths 400 is shown. In the illustrated embodiment, a clock source, such as an off-die crystal oscillator provides a reference clock signal to PLL 110b of the multiple PLLs 110a-110g. In the example shown, this reference clock signal has a reference frequency of 24 MHz although any frequency value may be chosen to fit a particular design. The PLL 110b may have divisor values loaded that are used to generate an output clock signal with an output frequency of 1026 MHz. This output clock signal may be received by multiple clock generating gates. For example, at least each of the clock MUX gates 402 and 404 and the enabled clock gate buffer 410 may receive this output clock signal. In this example, the PLL 110b is the "parent" and each of the gates 402, 404 and 410 are the "children".

The MUX gate 402 may be coupled to a configuration register that holds the select input value 2. The input clock lines for the MUX gates 402, 404, 412 and 414 shown in the illustrated example may be numbered 0 to 3 from left to right. Therefore, the output clock signal from the PLL 110b is selected by MUX gate 402 to be provided on the output line. The N divider 406 receives this output clock signal from the MUX gate 402 and provides an associated output clock signal with an output frequency of 342 MHz. The N divider 406 may be coupled to a configuration register that holds the integer divisor value of 3.

The select input value of 2 for the MUX gate 402 may not be sent to the MUX gate 402 until the clock signal from the PLL 110b is stable and the N divider 406 has received its integer divisor value and is ready for a new input clock signal. The N divider 406 provides a clock signal to at least the MUX gate 412, the MUX gate 414 and the enabled clock buffer 416. For these gates, the N divider 406 is a "parent" and each of the clock receiving gates 412, 414 and 416 are "children". The loading and use of select input values and integer divisor values may be performed similarly for MUX gates 404, 412, and 414 and for N dividers 408, 418 and 420. The N divider 418 may provide one of the core clocks 240a-240j to IC device 260d. The N divider 418 is the "parent" for IC device 260d. The IC device 260d is the "child" for the N divider 418. These parent-child relationships and near-neighbor communication described above may be used by the HCCU 166 to correctly provide clocks signals through the CSN 220 and provide associated core clocks to IC devices being enabled. Similarly, the HCCU 166 may use the parent-child relationships and near-neighbor communication to progressively disable gates and core clocks when IC devices are disabled.

Figure 5:
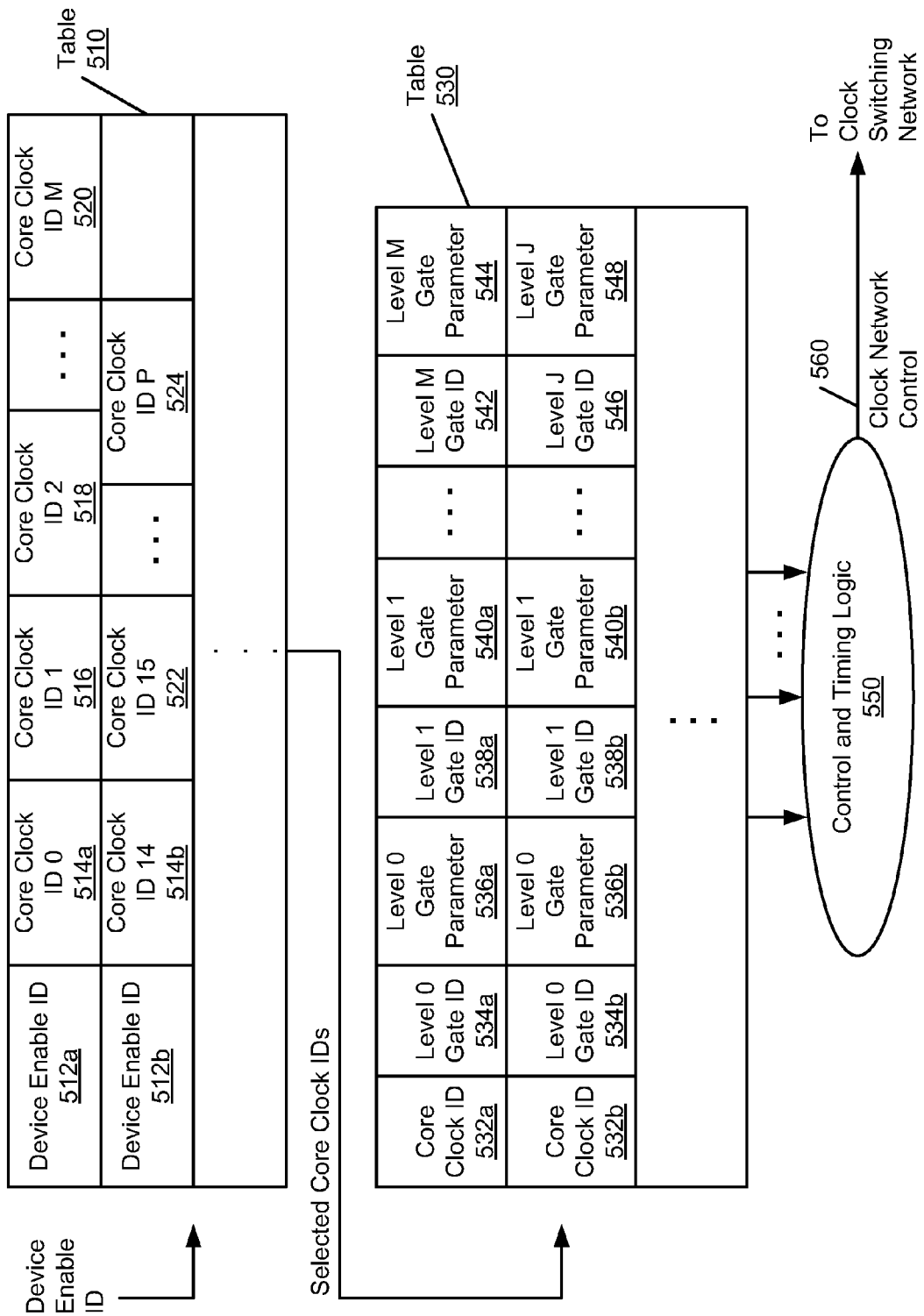
FIG. 5 is a generalized block diagram illustrating one embodiment of search logic for determining clock control signals when a device enable identifier is provided.

Referring now to FIG. 5, a generalized block diagram illustrating one embodiment of search logic for determining clock control signals when a device enable identifier is provided. The software 210 may issue an IC device enable operation to be performed. This operation may identify one of the general-purpose processors, GPUs or other IC devices on the SOC to be enabled. The software 210 may provide an IC device enable identifier. This value may be used to index a table 510.

Each entry of the table 510 may include an IC device enable identifier (ID). The first entry has a first field 512a storing an IC device enable ID value. A second entry has a first field 512b storing an IC device enable ID value and so forth. Each entry may store identifiers (IDs) of one or more core clocks of the core clocks 240a-240j that correspond to an IC device enable ID stored within the same entry. For example, the first entry in table 510 has at least fields 514a, 516, 518 and 520 to store associated core clock IDs. The second entry has at least fields 514b, 522 and 524 to store associated core clock IDs. Each entry in table 510 may have a different number of fields, since each IC device may have a different number of associated core clocks than other IC devices. The selected core clocks IDs from table 510 may be used to index table 530.

Each entry of the table 530 may include a core clock ID. The first entry has a first field 532a storing a core clock ID value. A second entry has a first field 532b storing a core clock ID value and so forth. Each entry may store identifiers (IDs) of one or more clock generating gates within the CSN 220 associated with a core clock ID stored in the same entry. In one embodiment, each entry may store associated parameters for the clock generating gates. Alternatively, these parameter values may be stored in separate configuration registers and corresponding register identifiers may be stored in the entries of table 530.

The first entry of table 530 may have at least fields 534a, 536a, 538a, 540a, 542 and 544 to store IDs of clock generating gates at different levels of the CSN 220 and current associated parameters. The IDs of the clock generating gates may identify the gates within the CSN 220 used to provide a core clock to a given IC device from a PLL at the top level of the CSN 220 to a level coupled to the given IC device. Referring again to FIG. 4, the clock generating gates used to provide a core clock to the IC device 260d include the PLL 110b, the MUX gate 402, the N divider 406, the MUX gate 412, and the N divider 418. The second entry of table 530 may include fields 534b, 536b, 538b, 540b, 546 and 548 to store IDs of clock generating gates at different levels of the CSN 220 and current associated parameters. Each entry in table 530 may have a different number of fields, since each core clock may have a different number of associated clock generating gates than other core clocks. The selected IDs from table 530 may be used in control and timing logic 550 to provide clock network control 560 values sent to the CSN 220. For example, the known parameters may be loaded according to a timing schedule. One such timing schedule may include waiting to provide select input values to a clock MUX gate until clock input lines are stable and an N divider coupled to an output line has received its integer divisor value and is setup for the specified frequency division.

Figure 6:
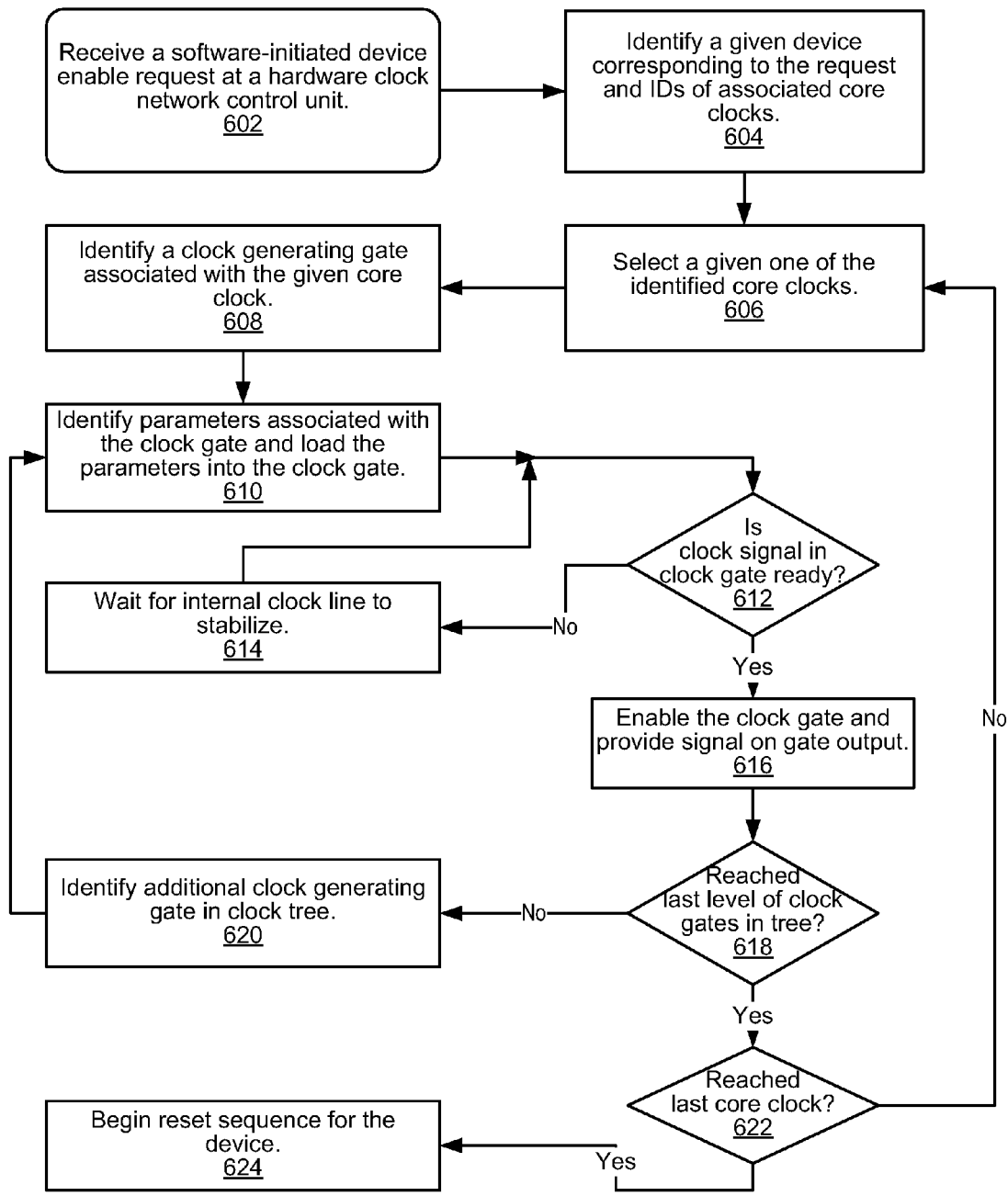
FIG. 6 is a generalized flow diagram illustrating one embodiment of a method for enabling an IC device on a SOC.

Turning now to FIG. 6, a generalized flow diagram illustrating one embodiment of a method 600 for enabling an IC device on a SOC is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 602, the HCCU 166 may receive an enable request from the software 210 specifying a given IC device on the SOC 100. In block 604, the HCCU 166 may use an IC device identifier to identify one or more core clocks of the core clocks 240a-240j associated with the specified IC device. In block 606, the HCCU 166 may select a given one of the identified core clocks. In block 608, the HCCU 166 may identify a clock generating gate at the top of a clock tree associated with the given core clock. For example, one of the PLLs 110a-110g may be identified and selected.

In block 610, the HCCU 166 may identify parameters associated with the clock generating gate and load the parameters into the clock gate. For a PLL, the parameters may include a pre-divider integer divisor value, a feedback integer divisor value, and a post-divider integer divisor value. For other clock generating gates, other parameters may be appropriate as described earlier. The parameters may be provided according to a timing schedule based on circuit characteristics. If an internal clock line is not yet stable with a correct frequency (conditional block 612), then in block 614, the HCCU 166 may wait before updating a next level of the CSN 220. When an internal clock line is stable with a correct frequency (conditional block 612), then in block 616, the HCCU 166 enables the clock generating gate, which provides an updated clock signal on its output line.

If the last level of the CSN 220 has not yet been reached (conditional block 618), then in block 620, the HCCU 166 moves to a next lower level of the CSN 220 and control flow of method 600 returns to block 610. If a last level of the CSN 220 has been reached (conditional block 618), but a last core clock associated with the specified IC device has not yet been reached (conditional block 622), then control flow of method 600 returns to block 606. If a last core clock associated with the specified IC device has been reached (conditional block 622), then in block 624, a reset sequence for the specified IC device may begin.

Figure 7:
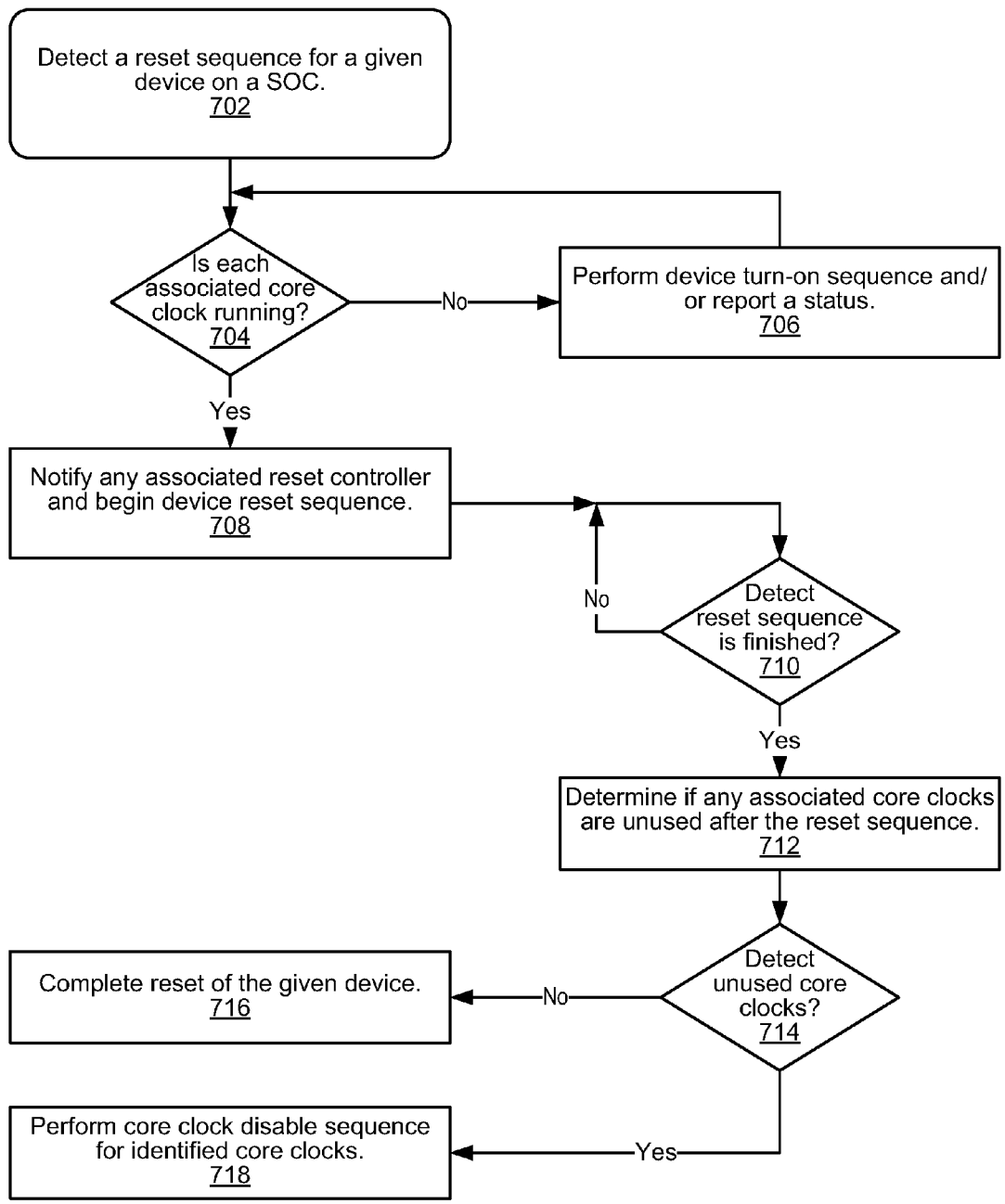
FIG. 7 is a generalized flow diagram illustrating one embodiment of a method for performing a reset sequence for a recently enabled IC device.

Referring now to FIG. 7, a generalized flow diagram illustrating one embodiment of a method 700 for performing a reset sequence for a recently enabled IC device is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 702, the HCCU 166 may detect a given IC device is ready for a reset sequence to begin. The HCCU 166 may have completed enabling clock generating gates to provide associated core clocks to the software-specified IC device. If each of the associated core clocks is not yet running (conditional block 704), then in block 706, the HCCU 166 may repeat performing an enabling procedure for the core clocks as described above regarding method 600. Alternatively, the HCCU 166 may send a status message to the software 210 and allow the software 210 to decide a next step. The HCCU 166 may both send a status message and repeat the enabling procedure.

If each of the associated core clocks is running (conditional block 704), then in block 708, the HCCU 166 may notify one or more associated reset controllers to begin an IC device reset sequence. When the HCCU 166 detects the reset sequence is completed (conditional block 710), then the HCCU 166 may determine whether any associated core clocks are unused after the reset sequence. This information may be stored in table 530 or another table. If there are not any associated core clocks unused after the reset sequence (conditional block 714), then in block 716, the reset sequence is completed and the enabling of the associated IC device is completed. Otherwise, in block 718, the HCCU 166 disables the identified core clocks by sequencing through the levels of the CSN 220. During this sequencing through the levels, the HCCU 166 disables associated clock generating gates in a manner that doesn't interfere with other clock signals within the CSN 220.

Figure 8:
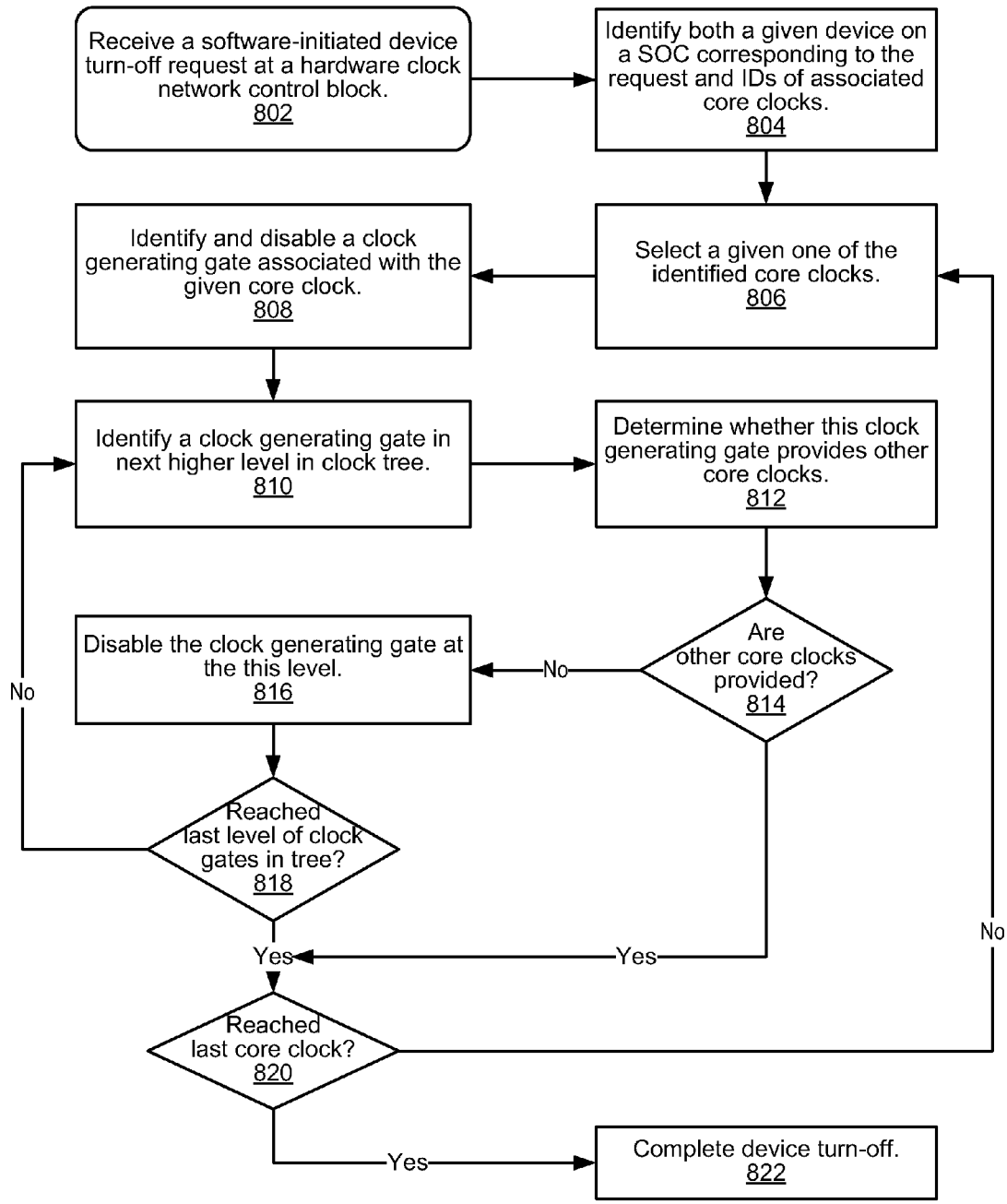
FIG. 8 is a generalized flow diagram illustrating one embodiment of a method for disabling core clocks on a SOC.

Turning now to FIG. 8, a generalized flow diagram illustrating one embodiment of a method 800 for disabling core clocks on a SOC is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 802, the HCCU 166 may receive a disable request from the software 210 specifying a given IC device on the SOC 100. In block 804, the HCCU 166 may identify IDs of core clocks corresponding to the specified IC device. In block 806, the HCCU 166 may select a given one of the identified core clocks.

In block 808, the HCCU 166 may identify and disable a clock generating gate at the bottom of a clock tree associated with the given core clock. In block 810, the HCCU 166 may identify a clock generating gate in a next upper level in the clock tree. In block 812, the HCCU 166 may determine whether this clock generating gate provides other core clocks. If this clock generating gate does not provide other core clocks (conditional block 814), then in block 816, the HCCU 166 may disable the clock generating gate at this current level.

Referring again to FIG. 4, if the IC device 260d is specified by the software 210 to be disabled, then in block 808 of method 800, the HCCU 166 may identify and disable the N divider 418 in the bottom level of the clock tree. In block 810 of method 800, the HCCU 166 may identify the MUX gate 412 as the clock generating gate in the next upper level of the clock tree. After determining the MUX gate 412 does not provide other core clocks, the HCCU 166 may disable the MUX gate 412. The N divider 406 may be identified as an associated clock generating gate in the next upper level of the clock tree. However, the N divider 406 does provide other core clocks. Therefore, the N divider 406 may not be disabled.

After disabling a clock generating gate in block 816 of method 800, if the last level of the clock tree has not yet been reached (conditional block 818), then control flow of method 800 returns to block 810. If a given clock generating gate at a current level of the clock tree does provide other core clocks (conditional block 814), then control flow of method 800 may move to conditional block 820. The clock generating gate is not disabled, since other "children" depend on the provided clock signal from this "parent" gate. A next core clock may be processed.

If the last level of the clock tree has been reached (conditional block 818), such as the top level including a PLL, but the last core clock has not yet been processed (conditional block 820), then control flow of method 800 returns to block 806. Otherwise, if the last core clock has been processed (conditional block 820), then in block 822 the disable request for the specified IC device is completed. The IC device may receive no running core clocks. The steps described in blocks 804-822 may occur without a received request from the software 210. The hardware may traverse up the clock tree and find enabled clock generating gates that are unused. The hardware may then turn off these gates.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   providing via a clock switching network (CSN) an associated one of a plurality of core clocks to each of a plurality of integrated circuit (IC) devices on a system-on-a-chip (SOC);
   receiving at a hardware clock control unit (HCCU) a software-initiated request specifying a first IC device identifier corresponding to the plurality of IC devices, wherein the software-initiated request is generated at least in part responsive to an earlier indication sent by the HCCU indicating the first IC device is ready for a change in one or more core clocks;
   selecting a given entry of a first table using the device identifier, wherein the first table comprises a plurality of entries and each entry of the plurality of entries associates a device identifier with one or more core clock identifiers;
   identifying one or more core clock identifiers within the given entry;
   for each of the one or more identified core clock identifiers, configuring circuitry within the CSN to generate an identified core clock.

2. The method as recited in claim 1, wherein for each of the one or more identified core clock identifiers, configuring circuitry within the CSN further comprises the HCCU:
   identifying one or more associated clock generating gates;
   for each one of the identified clock generating gates, loading parameter values corresponding to an identified core clock; and
   enabling each one of the identified clock generating gates according to a timing schedule preventing an output of each one of the identified clock generating gates from changing until each corresponding input has stabilized.

3. The method as recited in claim 2, wherein the parameter values include at least one of the following: a select value for a clock switching circuit gate and a divisor value for a clock frequency divider circuit gate.

4. The method as recited in claim 1, further comprising the HCCU:
   detecting each clock corresponding to the one or more core clock identifiers is enabled; and in response to said detection, sending an indication to a reset controller corresponding to the first IC device to begin a reset sequence for the first IC device.

5. The method as recited in claim 1, further comprising the HCCU:
receiving a software-initiated request specifying a second IC device of the plurality of IC devices is to be disabled;
identifying one or more core clocks of the plurality of core clocks used by circuitry within the second IC device; and
for each one of the identified core clocks, disable associated circuitry within the CSN to disable an identified core clock.

6. The method as recited in claim 1, further comprising using a core clock identifier of the identified core clock identifiers to access a second table, wherein the second table comprises a plurality of entries and each entry of the plurality of entries associates a core clock identifier with one or more clock gates within the CSN.

7. The method as recited in claim 1, further comprising the HCCU:
determining a given clock generating gate in a given level of the CSN has no enabled targets, wherein a target is another clock generating gate or an IC device; and
in response to said determination, disabling the given clock generating gate.

8. The method as recited in claim 7, further comprising the HCCU traversing the CSN from a bottom level to a top level when performing said determination.

9. A system-on-a-chip (SOC) comprising:
a software interface;
a plurality of phase lock loops (PLLs);
a plurality of integrated circuit (IC) devices, each configured to receive one or more associated core clocks of a plurality of core clocks provided by one or more of the plurality of PLLs via a clock switching network;
a hardware clock control unit (HCCU) coupled to the software interface and the clock switching network; and
a table comprising a plurality of entries, wherein each entry of the plurality of entries associates a device identifier with one or more core clock identifiers;
wherein the HCCU is configured to:
receive a software-initiated request specifying a first IC device identifier corresponding to the plurality of IC devices, wherein the software-initiated request is generated at least in part responsive to an earlier indication sent by the HCCU indicating the first IC device is ready for a change in one or more core clocks;
select a given entry of the table using the first IC device identifier;
identify one or more core clock identifiers within the given entry;
for each one of the one or more identified core clock identifiers, configure associated circuitry within the clock switching network (CSN) to generate an identified core clock.

10. The SOC as recited in claim 9, wherein for each of the one or more identified core clock identifiers, the HCCU is configured to:
identify one or more associated clock generating gates within the CSN;
for each one of the identified clock generating gates, load parameter values corresponding to an identified core clock; and
enable each one of the identified clock generating gates according to a timing schedule preventing an output of each one of the identified clock generating gates from changing until each corresponding input has stabilized.

11. The SOC as recited in claim 10, wherein the HCCU is further configured to read the parameter values from programmable clock configuration registers.

12. The SOC as recited in claim 9, wherein the HCCU is further configured to:
detect each clock corresponding to one or more core clock identifiers is enabled; and
in response to said detection, send an indication to a reset controller corresponding to the first IC device to begin a reset sequence for the first IC device.

13. The SOC as recited in claim 12, wherein the HCCU is further configured to:
receive an indication from the reset controller that the reset sequence is complete;
in response to said detection:
identify a subset of the identified core clocks unused after the reset sequence; and
for each one of the core clocks in the identified subset, configure associated circuitry within the CSN to disable an identified core clock.

14. The SOC as recited in claim 9, wherein the HCCU is further configured to:
receive a software-initiated request specifying a second IC device of the plurality of IC devices is to be disabled;
identify one or more core clocks of the plurality of core clocks used by circuitry within the second IC device; and
for each one of the identified core clocks, disable associated circuitry within the CSN to disable an identified core clock.

15. The SOC as recited in claim 9, wherein the HCCU is further configured to use a core clock identifier of the identified core clock identifiers to access a second table, wherein the second table comprises a plurality of entries and each entry of the plurality of entries associates a core clock identifier with one or more clock gates within the CSN.

16. The SOC as recited in claim 9, wherein the HCCU is further configured to:
determine a given clock generating gate in a given level of the CSN has no enabled targets, wherein a target is another clock generating gate or an IC device; and
in response to said determination, disable the given clock generating gate.

17. A hardware clock control unit (HCCU) on a system-on-a-chip (SOC) comprising:
a first interface configured to receive software-initiated requests;
a second interface coupled to a clock switching network (CSN) configured to provide an associated one of a plurality of core clocks to each of a plurality of integrated circuit (IC) devices on a system-on-a-chip (SOC);
a table comprising a plurality of entries, wherein each entry of the plurality of entries associates a device identifier with one or more core clock identifiers;
wherein the control logic is configured to:
receive a software-initiated request specifying a first IC device identifier corresponding to the plurality of IC devices, wherein the software-initiated request is generated at least in part responsive to an earlier indication sent by the HCCU indicating the first IC device is ready for a change in one or more core clocks;
select a given entry of the table using the first IC device identifier;
identify one or more core clock identifiers within the given entry;
for each one of the one or more identified core clock identifiers, configure associated circuitry within the clock switching network (CSN) to generate an identified core clock.

18. The HCCU as recited in claim 17, wherein for each of the one or more identified core clock identifiers, the control logic is configured to:

identify one or more associated clock generating gates within the CSN;

for each one of the identified clock generating gates, load parameter values corresponding to an identified core clock; and enable each one of the identified clock generating gates according to a timing schedule preventing an output of each one of the identified clock generating gates from changing until each corresponding input has stabilized.

19. The HCCU as recited in claim 17, wherein the control logic is further configured to:

receive a software-initiated request specifying a second IC device of the plurality of IC devices is to be disabled;

identify one or more core clocks of the plurality of core clocks used by circuitry within the second IC device; and for each one of the identified core clocks, disable associated circuitry within the CSN to disable an identified core clock.

20. The HCCU as recited in claim 19, wherein the control logic is further configured to:

determine a given clock generating gate in a given level of the CSN has no enabled targets, wherein a target is another clock generating gate or an IC device; and in response to said determination, disable the given clock generating gate.

\* \* \* \* \*